United States Patent [19]

Akao

[11] Patent Number: 4,587,175
[45] Date of Patent: May 6, 1986

[54] LAMINATE SHEETS

[75] Inventor: Mutsuo Akao, Minami-ashigara, Japan

[73] Assignee: Fuji Photo Film Co., Ltd., Minami-ashigara, Japan

[21] Appl. No.: 686,385

[22] Filed: Dec. 26, 1984

[30] Foreign Application Priority Data

Dec. 28, 1983 [JP] Japan .................................. 58-251914

[51] Int. Cl.[4] ............................................... B32B 3/10
[52] U.S. Cl. .................................... 428/596; 428/139; 428/140; 428/219; 428/220; 428/910; 428/134; 428/458; 428/461; 428/463
[58] Field of Search .............. 428/138, 139, 140, 910, 428/219, 220, 596, 134, 458, 461, 463

[56] References Cited

U.S. PATENT DOCUMENTS

| | | | |
|---|---|---|---|
| 1,274,323 | 7/1918 | Poetschke | 428/140 |
| 2,071,921 | 2/1937 | Dickson | 428/139 |
| 4,331,725 | 5/1982 | Akao | 428/138 |

Primary Examiner—Alexander S. Thomas
Attorney, Agent, or Firm—Burns, Doane, Swecker & Mathis

[57] ABSTRACT

A laminate sheet of at least three layers including a perforated sheet layer, and flexible sheet layers laminated on both sides of the perforated sheet layer wherein:
  (a) said perforated sheet layer has a thickness of 0.006 to 1.0 mm and an aperture rate of 10 to 90%,
  (b) an adhesive layer is applied on only one of said flexible sheet layers and the other flexible sheet layer is bonded by the adhesive layer extending throughout said apertures, and
  (c) said two flexible sheet layers are bonded together through said perforated sheet layer by means of said adhesive layer over an area of 5 to 95% of the overall area.

The perforated sheet layer is formed of a metal foil, paper, unwoven fabrics, cellophane, cloth, and uniaxially molecule-stretched thermoplastic triacetate film or a thermoplastic resin film.

The apertures in the perforated sheet layer have a diameter of 0.5 to 25 mm.

20 Claims, 10 Drawing Figures

LAMINATE SHEETS

FIELD OF THE INVENTION

The present invention relates to a laminate sheet which is particularly suitable for the packaging of photosensitive materials.

BACKGROUND OF THE INVENTION

Various types of laminate sheets have widely been used in practical fields, and have been required to possess diverse properties according to use. The properties required for many packaging materials including photosensitive materials are that they are hard to break and curl, have large impact resistance and flexibility, are susceptible to heat sealing for sealing, and the like. The realization of cheap, sealable, seal-packageable and difficult-to-curl laminates having improved tensile strength, Gelbo test strength, drop strength and resistance to impact without deteriorating certain properties such as cushioning, flatness and slip properties would lead to opening up new avenues for use, for instance, finding use in the packaging of photosensitive materials with such laminate sheets, said photosensitive materials having so far been packaged in sealed metallic containers for transportation. In addition, such laminate sheets are expected to offer practical advantages, e.g., be used to control moisture-proofness and gas barrier and be effective in reductions in weight of packages and prevention of breakage thereof. The present applicant has already disclosed such packaging materials in Japanese Patent Kokai Publication No. 57-6754 (U.S. Pat. No. 4,331,725).

SUMMARY OF THE DISCLOSURE

The present invention has for its object to improve such packaging materials and, further, provide practical laminate sheets.

More specifically, the laminate sheet according to the present invention comprises an at least three layer-laminated sheet including flexible sheet layers laminated on both sides of a perforated sheet layer, wherein an adhesive (layer) is applied on only one of said two flexible sheet layers so as to bond said one flexible sheet layer to the other flexible sheet layer over a 5 to 95% area of the entire area through the apertures in said perforated sheet. The perforated sheet has a thickness of 0.006–1.0 mm and an aperture rate of 10–90% of the entire surface area.

BRIEF DESCRIPTION OF THE DRAWINGS

The foregoing and other objects and features of the present invention will become apparent from the following detailed description with reference to the accompanying drawings, which are given for the purpose of illustration above, and in which.

DETAILED DESCRIPTION OF THE PREFERRED EMBODIMENTS

Figure 1:
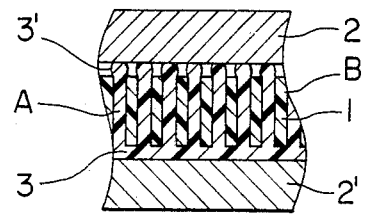
FIGS. 1 to 5 are partly sectioned view showing the laminate sheets according to the present invention.

Compositionally, the perforated sheet layer used in the present invention is comprised of thermoplastic resin, a flexible sheet, or rubber or the like, or a laminated sheet thereof. The thermoplastic resin includes, for instance, polystyrenes, olefinic polymers such as polypropylenes, polyethylenes and polybutene or olefinic copolymers such as ethylene-propylene, ethylene-butene, ethylene-vinyl acetate (EVA), and ethylene-ethylacrylate (EEA) copolymers, copolymers composed mainly of ethylene such as chlorinated polyethylene, copolymers composed mainly of propylene, or thermoplastic resin consisting of one or more of polyamide, polyacetal, polyvinyl chloride (PVC), polyvinylidene chloride (PVDC), polycarbonate, polyethylene terephthalate (PET), polyphenylene oxide, etc. The flexible sheet comprises metal foils such as aluminum, iron and tin, unwoven fabrics, cellophane, cloth, cellulose triacetate films, cellulose diacetate films, aluminum-deposited sheets, aluminum-deposited films and heat-resistant flexible sheets such as laminated films of two or more sheets thereof. The rubber or the like encompasses polyurethane, natural rubber, synthetic rubber such as styrene-butadiene rubber or a mixture of synthetic rubber with a minor amount of other plastics or rubber. However, the preferred perforated sheets effectively used in the present invention are chemically or physically perforated sheets substantially comprising a thermoplastic resin film (including a single-layer extruded film or co-extruded film of two or more layers) composed mainly of polystyrene, polyamides (nylons), EVA, EEA, PET, PVC, PVDC, HDPE, MDPE, LDPE, low-pressure linear low-density polyethylene (L-LDPE) and polypropylene.

The preferred perforated sheet layer suitable for use in packaging materials has a thickness of 0.006 to 1.0 mm. When the thermoplastic resin film is used, the perforated sheet layer has a thickness of preferably 0.015 to 1.0 mm, more preferably 0.02 to 0.2 mm.

A thickness exceeding 1 mm makes difficult the production of perforated sheets, and allows the amount of resin used to increase, resulting in a rise in the production cost. Also, it is further required to increase the amount of adhesives used to laminate the flexible sheet layers on both sides of the perforated sheet, thus posing problems that are practically difficult to solve, such as a lowering of the application rate of adhesives, a rise in the material cost, variations in the adhesion strength, a drop of flatness and an increase in the rigidity of the laminate sheet.

In a thickness below 0.006 mm, the perforated sheet produces no sufficient effect on the laminate sheet, and offers problems such as a decrease of Gelbo test strength, tensile strength and impact perforation resistance, in addition to those disadvantages such as frequent occurrence of breakage or rupture at perforation of the perforated sheet during manufacturing.

Representative methods for the production of the perforated sheets involve physical perforation of the previously prepared sheets by using a punch die process or a rotary body thereon includng pointed needles (which may be heated). In the case of perforated sheets formed of, e.g., thermoplastic resin films, etc., perforation may be performed simultaneously with or just after film extrusion. Alternatively, extruded films may be cooled and, thereafter, physically perforated with a pointed rotary body prior to take-up, or they may be perforated off-line with a punch die, etc. after take-up.

In a still alternative process, thermoplastic resin or various rubber and polyurethane, etc. may be mixed with a foaming agent for perforation. Furthermore, two or more of the aforesaid processes may be used in combination.

Particular preference is given to perforation carried out simultaneously with film extrusion using thermoplastic resins such as various polyethylenes, various polypropylenes, various nylons, polystyrene, EVA, EEA, PVC, etc. in view of material savings. This is also because attractive and tough perforated sheets (films) can be obtained without leaving behind any burrs (which may otherwise be formed during perforation) or any cutting crack. For the single- or co-extrusion of films, known processes may be applied such as T-die process, inflation process, underwater rotary tube-forming process, etc.

After perforation, the films are cooled, and uniaxially or biaxially stretched, thereby producing perforated sheets (films) which have a thickness smaller than that of the unstretched sheets, but yet excel in strength and have a larger aperture size and aperture rate.

The apertures may take on every form, and may for instance be in the form of a circle, oval, pillow, petal, gourd and cocoon as well as in the triangular-octagonal form or other polygonal form having an angle of 90° or greater. However, it is desired in view of the strength and simplified production of perforated sheets that the apertures be in the form of a circle, oval, pillow, petal and gourd as well as in the polygonal form whose apices are rounded, especially in the rounded form such as a circle or oval. The apertures may be a mixture of two or more different shapes and sizes, and may be distributed unevenly. Typical shapes of apertures are sketched in FIG. 7.

An aperture rate defined by $$\frac{\text{Area of aperture in unit area}}{\text{Unit area of sheet (e.g., m}^2\text{)}} \times 100$$

is 10–90%, preferably 20–80% and more preferably 30–70%.

In an aperture rate of 10% or less, when an adhesive layer is applied over only one of the flexible sheet layers laminated onto both sides of the perforated sheet, an area of the adhesive layer to be bonded to the other flexible sheet layer is apt to reduce to 5% or less, resulting in failures such as interlayer peeling.

An aperture rate exceeding 90% causes a drop of strength of the perforated sheet, so that it frequently breaks or cracks, and the resulting laminate deteriorates in flatness and is not improved in respect of tensile strength, resistance to impact perforation, Gelbo test strength, etc., to fail to attain the desired object.

Similar effects are obtained over a bonding area of 5 to 95%, but a preferred bonding area lies between 15 and 70%.

In the perforated sheet, the apertures have a diameter of 0.5 to 25 mm, preferably 1.0 to 20 mm, and most preferably 2 to 15 mm. In an aperture diameter of less than 0.5 mm, there are problems similar to those arising when the aperture rate is less than 10% while, in an aperture diameter exceeding 25 mm, there are problems similar to those arising when the aperture rate exceeds 90%.

The flexible sheet layers laminated on both sides of the perforated sheet layer may be identical or different.

Typical examples of the flexible sheet layers include various types of papers, aluminum-deposited films, metal foils such as aluminum and tin foils, unwoven fabrics, cross yarns, cellophane, cloths, various thermoplastic resins such as, for instance, polyethylenes (LDPE, MDPE, HDPE, L-LDPE, etc.), polypropylenes, cellulose triacetate, polyester, polyamides (nylon-66, 6, etc.), polycarbonate, polyvinylidene chloride, polyvinyl chloride, polystyrene or copolymers composed mainly of such polymers such as, for instance, EVA and EEA, or mixtures of two or more of these thermoplastic resins. Preferable in view of cost, availability, general-purpose properties and production flexibility are polyethylene terephthalate (PET), high-density polyethylene (HDPE), medium-density polyethylene (MDPE), high-pressure low-density polyethylene (LDPE), low-pressure linear low-density polyethylene (L-LDPE) and polypropylene (PP). Particular preference is given to high-density polyethylene having a density of 0.94 g/cm$^3$ or higher. Effectively, these thermoplastic resin films are molecule-oriented in the uniaxial or biaxial direction.

Referring in detail to especially preferred uniaxially molecule-orientated films, they are composed mainly of thermoplastic resins such as, for instance, polyethylenes, polypropylenes, polyester, polyamide, polycarbonate, polyvinylidene chloride, polyvinyl chloride, polystyrene, etc., or copolymers containing such polymers as the main component, or mixtures of two or more of such thermoplastic resins. High-density polyethylene and medium-density polyethylene and low-pressure linear low-density polyethylene (L-LDPE) are preferred. Particular preference is given to L-LDPE and high-density polyethylene having a thickness of 15 to 120 microns and a density of 0.94 g/cm$^3$ or higher.

When the uniaxially molecule-oriented (stretched) films are laminated on both sides of the perforated sheet, their components may be identical or different. In addition, the rate of molecular orientation, drawing rate, thickness and such may be identical or different.

The wording "uniaxially molecule-oriented films" referred to herein shall encompass films with the rate of molecular orientation in the molecular direction being higher than that in the direction at right angles therewith by a factor of 1.5 or more. For instance, a film inflated at a blow-up ratio of 2 and longitudinally stretched three times is taken as being a longitudinally three-times stretched film.

Generally, the uniaxially molecule-oriented films refer to (laterally or longitudinally) stretched films (obtained by means of a tenter). In the present invention, however, that wording shall embrace physically shaped (embossed) or inflated films (tubular films) that are molecularly oriented in an increased blow-up ratio as well as films that are strongly molecule-oriented in the longitudinal direction, and then spirally cut for oblique molecular orientation (e.g., 45°). Known examples of the production of uniaxially molecule-oriented (stretched) films are for instance disclosed in Japanese Patent Kokai-Publication Nos. 47-34656 and 48-100464 (corresponding to B.P. 1414681 and U.S. Pat. No. 3,891,374) as well as Japanese Patent Kokoku-Publication Nos. 40-5319, 47-38621, 47-39927 and 53-18072, the disclosures whereof are herein incorporated by reference thereto.

Although molecular orientation may be effected in any one of the longitudinal, lateral and oblique directions, yet it is advantageous that the axes of molecular orientation of the two films laminated on both sides of the perforated sheet are laminated to each other at angles of 30° or more.

When the tensile strength in every direction is kept constant on the average, it is advantageous that the cross angles of the molecular orientation axes are maintained at 90°. This implies that longitudinally and laterally oriented films may be laminated on the perforated sheet, or 45°-oriented films may be laminated on that sheet with the axes of molecular orientation intersecting at right angles.

In the latter case, the perforated sheet may be inserted into the center bore of a molecularly oriented tubular film or a film tubularly stretched and extruded without cutting for the purpose of lamination.

When it is desired to enhance the tensile strength in a certain direction, the cross angles may advantageously be 30° to less than 90°, rather than just 90°. However, since the tear strength parallel with the axes of molecular orientation or the tensile strength normal thereto drops at decreased cross angles. Thus, the cross angles are 30° or more, preferably in a range of 45° to 90° for the purpose of general packaging materials.

The degrees of molecular orientation and stretching may be selected depending upon the components and the use of the product, and no particular limitation is imposed thereupon. However, a noticeable stretching effect is achieved, when the degree of stretching is in a range of 2 to 15. In the case where the light-shielding material is contained, it is preferred that the degree of stretching is in a range of 2 to 7 in view of the quality of films expressed in terms of the occurrence of fisheyes.

The thickness of the uniaxially molecule-oriented films may be selected depending upon the purpose, but may generally be in a range of 15 to 120 microns for the purpose of packaging materials.

The three-layer laminates including flexible sheet layers laminated on at least both sides of a perforated sheet layer should have a thickness of 0.046 to 2.5 mm, preferably 0.06 to 0.55 mm in view of the price, rigidity, processing properties on film manufacturing (e.g., heat-seal properties, curling, ease in bag-making, liability to folding and cutting properties), physical strength, production flexibility, etc.

Typical examples of the adhesives include hot-melt adhesives based on polyolefinic thermoplastic resins such as polyethylenes, polypropylene and polybutene, hot-melt adhesives based on thermoplastic resins such as olefinic copolymers, for instance, ethylene-propylene copolymers, ethylene-vinyl acetate copolymers, ethylene-acrylate copolymers as well as ionomer resins or the like, and other hot-melt type rubber base adhesives. Solution adhesives may include wet-laminating adhesives, which are available in the emulsion or latex form. The emulsion type adhesives typically include emulsions of polyvinyl acetate, vinyl acetate-ethylene copolymers, vinyl acetate-acrylate copolymers, vinyl acetate-maleate copolymers, acrylic polymers, ethylene-acrylic acid copolymers, etc., whereas the latex type adhesives typically include rubber lattices such as natural rubber, styrene-butadiene rubber (SBR), acrylonitrile-butadiene rubber (NBR), chloroprene rubber (CR), etc. Polyurethane adhesives may be used as dry-laminating adhesives. In addition to the foregoing, use may be made of known adhesives such as hot-melt laminating adhesives comprising blends of paraffin wax, microcrystalline wax, ethylene-vinyl acetate copolymer resin, ethylene-acrylic acid copolymer resin, etc. Concretely speaking, the polyolefinic adhesives include polyolefin polymers such as polyethylenes, polypropylene, polystyrene, EPR, polyolefin copolymers such as EVA and EEA, copolymers of ethylene and other monomers such as low-pressure linear low-density polyethylene (L-LDPE), ionomer resins (ionic copolymers) such as Surlyn (Du Pont) and Admer (Mitsui Polychemical) and graft polymers.

These adhesives should preferably have a melting point lower than those of the flexible sheet layers by 5° C. or larger. Given such a difference in melting point, complete hot-melt adhesion is achieved without having any adverse influence upon the flexible sheet layers.

Especially when any one of the flexible sheet layers to be laminated on both sides of the perforated sheet and the perforated sheet layer is molecularly oriented, use may be made of an adhesive layer that is a thermoplastic resin and can be bonded at a temperature at which no adverse influence is produced on the properties of the molecularly oriented films (e.g., at a temperature of about 250° to 350° C., when those films are formed of HDPE), such as high-pressure low-density polyethylene (LDPE), ethylene-vinyl acetate copolymers (EVA), ethylene-ethyl acrylate copolymers (EEA), ionomer resin, low-pressure linear low-density polyethylene (L-LDPE), etc.

The thickness of the adhesive layer is usually 0.01 to 1.0 mm, preferably 0.015 to 0.2 mm, and may be determined depending upon the cost, the rate of application, the overall thickness of the laminates, etc., but is not particularly limited.

Adhesive is applied on only one side of the perforated sheet layer, and the flexible sheets are laminated on both sides thereof. In this arrangement, the adhesive passes through the apertures and reach the opposite side for adhesion to the other flexible sheet. However, there is no bonding between the perforated sheet and the flexible sheet on the unperforated area of said opposite side of the perforated sheet, thus leaving voids. Such partial adhesion results in increases in the tear strength and the resistance to breaking. However, such an effect is not obtained at all, when the adhesive layers are applied entirely over both sides of the perforated sheet.

Application of the adhesive on one side of the perforated sheet layer serves to simplify the lamination step to a considerable degree and, at the same time, decreases the amount thereof. Thus, the present invention can provide a packaging material which stands up to tearing and breaking and is economical.

The packaging materials of the present invention may be utilized to package a variety of commercial articles, and is best-suited for packaging photosensitive materials. For that purpose, at least one layer of the overall laminate is required to have light-shielding property. To this end, the light-shielding material may be added to one or more of the flexible sheet layers, the perforated sheet layer and the adhesive layer. Alternatively, said one or more layers may be laminated with a light-shielding layer(s) consisting of a colored paper, a metal sheet having a thickness of 5 to 50 microns such as an aluminum foil or zinc-plated thin steel plate, or metal-deposited paper (e.g., aluminum-deposited paper) or a metal-deposited film (e.g., an aluminum-deposited film). Still alternatively, printing may be applied for the purpose of light-shielding.

The suitable amount of the light-shielding material, if present, is in the range of 0.5 to 20 grams per unit area ($m^2$) of the overall laminate. The addition of the light-shielding substance to the stretched film in an amount of 12 $g/m^3$ is unpreferred in that the occurrence of fisheyes generally leads to drop of physical strength. A preferable amount of the light-shielding material is therefore in a range of 0.5 to 7% by weight except for the case of unstretched films or flexible sheets such as paper. The light-shielding material includes any substance which does not transmit visible and ultraviolet light therethrough, and typically includes various types of carbon black, aluminum powders, coloring pigments, coloring dyes, white pigments such as titanium oxide, barium oxide, calcium oxide and clay, various powdery metals, various fibrous metals and such. In respect of quality, cost and light-shielding power, carbon black, aluminum powders and aluminum paste which are freed of low-volatile ingredients are preferred for use in packaging photosensitive materials.

To improve the light shielding property as much as possible at the same amount, it is desired to incorporate the light-shielding material onto the inside (to come in contact with the article to be packaged, or the side of a bag to be heat-sealed).

As mentioned in the foregoing, the present invention inevitably involves four layers, i.e., two flexible sheet layers, one perforated sheet layer and one adhesive layer. In carrying out the present invention, however, an additional layer or layers may be laminated.

For instance, improvements may be introduced in heat seal properties, strength, slip properties, antistatic properties, printability, light-shielding properties, appearance, etc., by the lamination of a further pliable sheet formed of, e.g., various types of papers, unwoven fabrics, cellophane and such.

In particular, non-heat melting layer such as a paper layer (having preferably a thickness of 30 to 110 microns) or a layer having a melting point higher than that of the innermost layer (to be heat-sealed) of one flexible sheet by at least 5° C. is used for the outermost layer thereof, whereby the low-melting sides are more easily heat-sealed together, resulting in the advantageous production of bags excelling in heat-seal properties.

The same effect is also obtained by forming an innermost layer (to be heat-sealed) of an easily heat-sealable layer having a melting point by at least 5° C. lower than that of the outermost molecule-oriented film. The formation of the easily heat-sealable layer may rely upon either coating or lamination. For instance, when a polyester or nylon film is used for the outermost layer as the stretched film, a low-density polyethylene film may be used for the innermost layer (to be heat-sealed) so as to achieve easier heat-sealing.

Referring especially to one example of the layer structure which makes it easier to achieve heat-sealing, when a uniaxially stretched molecule-oriented film is used as the flexible sheets to be laminated on both sides of the perforated sheet, it is advantageous that the surface layer (the inner layer) of one flexible sheet is formed of an easily heat-sealable film having a melting point lower (preferably by at least 10° C.) than that of the uniaxially molecule-stretched film. As the heat-seal layer use may be made of, for instance, thermoplastic resin films formed of, e.g., polyethylene, polypropylene, nylon, polyester, ethylene-vinyl acetate copolymers (EVA), ethylene-acrylate copolymers (EEA), polyvinyl acetate (PVC), polyvinylidene chloride (PVCD), etc., provided that the thickness thereof is on the order of 10 to 80 microns in the case of extrusion coating, and on the order of 30 to 120 microns in the case of inflating for lamination. Most preference is given to high-pressure low-density polyethylene, ethylene-vinyl acetate copolymers, ionomers, linear low-density polyethylene (L-LDPE), ethylene-ethylacrylate copolymers (EEA), etc.

When incorporating photosensitive materials, it is desired that the slip properties of the layer contacting those materials be expressed in terms of an angle of slide of 25° or lower (preferably 3° to 25°). Such properties are achieved by adding lubricants or matting the surface of that layer. Alternatively, the aforesaid slip properties may be brought up to a satisfactory level by selecting the material of the film defining a heat-seal surface (the film surface contacting the article).

The laminated film obtained according to the foregoing excels in the resistance to curling, and is useful as the packaging material due to its improved tear strength, resistance to impact perforation, article insertability, Gelbo test strength and drop strength. The film of the present invention, to which the light shielding properties are particularly afforded, is best-suited for use in the packaging of photosensitive materials.

In one preferred embodiment of the present invention, for instance, the preferred packaging material for photosenstive materials comprises a laminate sheet comprised of a perforated sheet, a first uniaxially stretched LDPE film laminated on one side thereof and a second uniaxially stretched MDPE film laminated on the opposite side of the perforated sheet:

the perforated sheet having a thickness of 0.006 to 1.0 mm and an aperture rate of 10 to 90% (with an aperture size of 0.5 to 25 mm);
  the first uniaxially stretched HDPE film being preferably obliquely stretched (including a longitudinally stretched film that is further slitted spirally), and having a magnitude of stretching of 2.0 to 7.0, a carbon black content of 0.5 to 7% by weight, a thickness of 15–70 microns and a density of 0.94 g/cm$^3$ or higher; and the first HDPE film being laminated with the use of a polyolefinic (encompassing ethylene copolymers such as LDPE, EEA, L-LDPE, PP, EVA and ionomers) adhesive layer;
  the second uniaxially stretched HDPE film being a preferably obliquely stretched HDPE film (including a longitudnally stretched film that is further slitted spirally), which film is different in thickness from the first uniaxially stretched HDPE film by at most 15% in such a manner that its stretching axis intersects that of the first uniaxially stretched HDPE film at an angle of 30° or larger, and the second HDPE film being laminated by means of the polyolefinic adhesive layer through the apertures in said perforated sheet;
  one or more of said layers containing carbon black in an amount of 0.5 to 20 g/m$^2$.

This packaging material is best-suited for use with photosensitive materials, and are significantly improved in physical strength, flexibility and curling properties.

Figure 2:
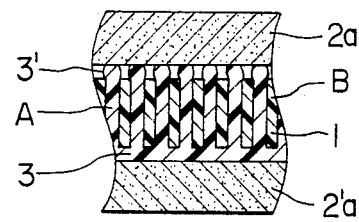
Figure 3:
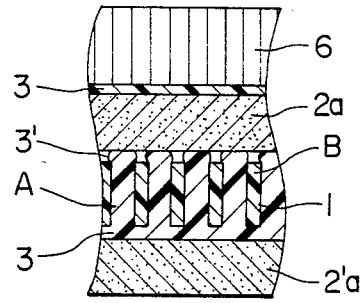
Figure 4:
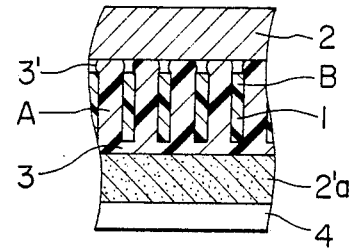
Figure 5:
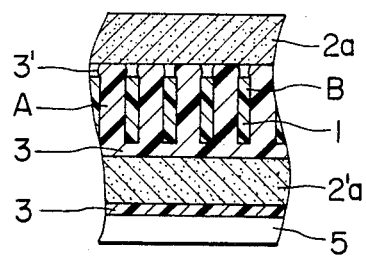
Figure 6:
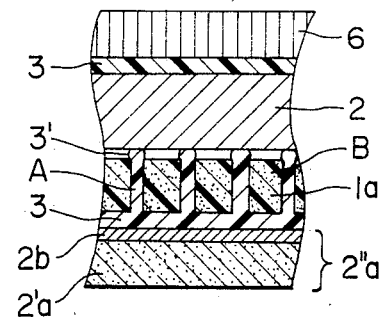
FIG. 6 is a partly sectioned view showing one application example of the present invention.

Referring now to FIGS. 1 and 2, there is shown the basic structure of the laminate sheet which provides the packaging material according to the present invention. A perforated sheet layer 1 is laminated on both its sides with flexible sheet layers 2 and 2' (FIG. 1) or (light-shielding material-containing) flexible sheets 2a and 2'a (FIG. 2) with the use of an adhesive layer 3. The adhesive layer 3 flows into apertures A in the perforated sheet to define an additional adhesive layer 3'. In FIG. 3, a further pliable sheet layer 6 having a heat resistance higher than that of 2'a is added to the basic structure of FIG. 2 through another adhesive layer 3. In FIGS. 4 and 5, heat seal layers 4 and 5 are laminated on the surfaces of the flexible sheet 2 or 2a, 2'a through (or not through) an adhesive layer. FIG. 4 illustrates one example where the flexible sheet contains a light-shielding material in its one side alone. The adhesive layer 3 is a hot-melt adhesive layer or other adhesive layer. In FIG. 6, an adhesive layer 3 is provided onto a flexible sheet 2"a obtained by forming an aluminum-deposited layer 2b to 2'a (2"a substituting 2'a of FIG. 5), wherein the flexible sheet 2"a is laminated on a flexible sheet 2 by an adhesive layer 3' formed through apertures A in a light-shielding material-containing perforated sheet 1a, followed by the additional lamination of a further pliable sheet layer 6 having a heat resistance higher than that of 2'a through the adhesive layer 3.

Figure 7:
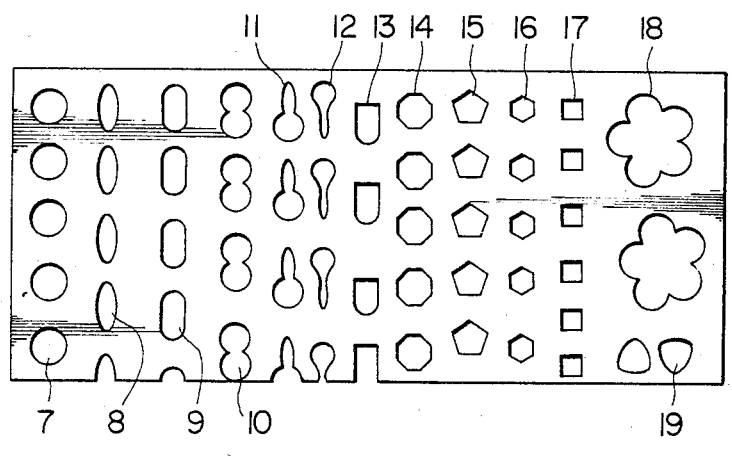
FIGS. 7 to 10 are plan views of the perforated sheets showing the shape and distribution of apertures.
Figure 8:
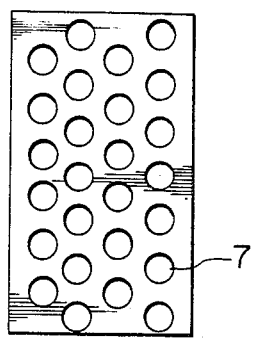
Figure 9:
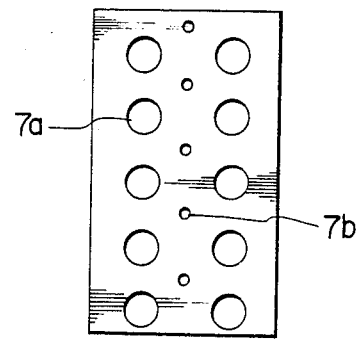
Figure 10:
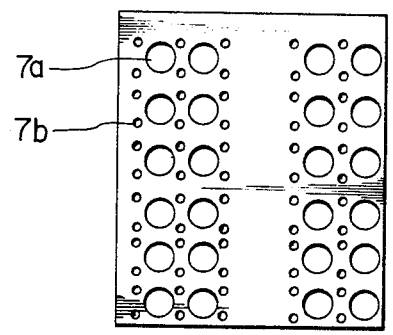

FIG. 7 illustrates various apertures in the preferred forms. Reference numeral 7 is a round form, 8 an oval form, 9 a pillow form, 10 a cocoon form, 11 and 12 each a gourd form, 13 an arched window form, 14 to 17 rectangular, pentagonal, hexagonal and octagonal forms, 18 a petal form, and 19 is a triangular form with rounded apices. Any other form of obtuse angles of 90° or larger may be used. Examples of undesired forms are star, triangular, diamond and other forms of acute angles of below 90°. FIGS. 8 to 10 illustrate some combinations of round apertures 7 of various sizes 7a and 7b.

Preferred embodiments and effects of the present invention will now be explained with reference to the following examples presented for illustrative purpose.

Examples

Six materials were prepared according to the present invention for the purpose of comparing with the prior art materials using an aluminum foil and obtained by a mere crosswide lamination of uniaxially stretched films.

The invented laminate (sheet) 1 was basically of the structure as shown in FIG. 1, wherein carbon black was added only to the layer 2'. As the perforated sheet layer 1 use was made of a perforated nylon-66 film having 6 mm-diameter round apertures and an aperture rate of 50% as well as a thickness of 35 microns, which was obtained by extrusion simultaneously with perforation, followed by biaxial stretching. A 40-micron thick low-density polyethylene was used as the adhesive layer, by means of which the perforated sheet layer was laminated with the flexible sheet 2'a, i.e., a 5 wt. % carbon black-containing and 70 micron-thick, low-pressure linear low-denisty polyethylene (L-LDPE-ULTZEX No. 2020L manufactured by Mitsui Petrochemical co., Ltd.) film obtained by the inflation process. The opposite flexible sheet 2, i.e., a biaxially stretched polyethylene terephthalate (PET) film of 20 microns in thickness was laminated on the perforated sheet layer 1 by means of the adhesive layer 3' defined though the apertures A in the perforated sheet layer 1.

The invented laminate (sheet) 2 was basically of the structure as shown in FIG. 2. As the perforated sheet layer 1 use was made of a perforated high-density polyethylene film having a thickness of 40 microns, a density of 0.96 g/cm$^3$, oval apertures each having a short side of 3 mm and a long side of 8 mm and an aperture rate of 40%. On the perforated film was laminated through a 45-micron adhesive low-density polyethylene (LDPE) a 70-micron thick flexible sheet 2'a film obtained from a mixture of 85% by weight of a low-pressure linear low-density polyethylene (L-LDPE), 10% by weight of LDPE and 5% by weight of carbon black by the inflation process. On the opposite side of the perforated sheet was laminated through an adhesive layer 3' defined through the apertures in the flexible sheet, viz., a 50-micron thick and 5% by weight carbon black-containing, laterally stretched high-density polyethylene film having a density of 0.96 g/cm$^3$.

The invented laminate (sheet) 3 of the structure as shown in FIG. 2. The perforated sheet layer 1 used was obtained by the punch pressing of a 9-micron thick aluminum foil, and had therein apertures of 3 mm in diameter and an aperture rate of 20%. The adhesive layer 3 applied was a 20-micron thick low-density polyethylene (LDPE), by means of which the flexible sheets 2'a and 2a were laminated upon each other through the perforated sheet layer with their orienting axes intersecting at right angles, said flexible sheets having been obliquely stretched high-density polyethylene films (BKM) having a carbon black content of 4.5% by weight, a density of 0.96 g/cm$^3$ and a thickness of 40 microns.

The laminate (sheet) 4 according to the present invention was of the structure as shown in FIG. 4. As the perforated sheet layer 1 use was made of a biaxially stretched and perforated polypropylene film of a 50 microns thickness which was obtained by extrusion with simultaneous perforation, followed by biaxially (lateral and longitudinal) stretching resulting in two types of apertures (one being in the round form of 2 mm in diameter and the other in the oval form of 3 mm in minor axis and 9 mm in major axis), and an aperture rate of 60%. The adhesive layer 3 applied was a 50-micron thick low-density polyethylene (LDPE), by means of which the perforated sheet layer 1 was laminated with a 60-micron thick flexible sheet 2'a obtained from a mixture of 75% by weight of L-LDPE, 25% by weight of LDPE, 3% by weight of carbon black and 2% by weight of aluminum paste by the inflation process. The perforated sheet layer 1 was then laminated on the opposite side with a flexible sheet 2, viz., a 40-micron thick, spun bonded polypropylene unwoven fabric layer, with the use of the adhesive layer 3' defined through the apertures A therein. A Surlyn layer of 20 microns in thickness was laminated on the flexible sheet 2'a as an additional heat sealing layer 4.

The laminate (sheet) 5 according to the present invention was of the same structure as in the invented laminate sheet 1. The perforated sheet layer 1 used was a 20-micron thick, biaxially stretched nylon film having therein round apertures of 5 mm in diameter and an aperture rate of 30%. The adhesive layer 3 applied was a 25-micron thick low-density polyethylene (LDPE), by means of which a flexible sheet 2'a, viz., a 70-micron thick LDPE film containing 3% by weight of carbon black. The perforated sheet layer 1 was then laminated on the opposite side with a flexible sheet 2 consisting of 35 g/m$^2$ of kraft paper with the application of the adhesive layer 3' defined trough the apertures A therein.

The laminate sheet 6 of the present invention was of the structure as shown in FIG. 5, wherein the biaxially stretched and perforated PET film had therein oval apertures of 2 mm in minor axis and 3 mm in major axis, and an aperture rate of 35%. The adhesive layer 3 applied was a 25-micron thick low-density polyethylene (LDPE), by means of which a flexible sheet 2'a consisting of kraft paper (35 g/m$^2$) containing 2% by weight of carbon black was laminated on the perforated film 1. The perforated film 1 was then laminated on the opposite side with a 50-micron thick LDPE flexible sheet film 2a containing 3% by weight of carbon black. Tables 1 and 2 show the layer details and properties of the laminate sheets.

As a result, it has been found that the laminates according to the present invention excel in tear strength, extent of impact perforation (representative of resistance to impact perforation), resistance to curling, Gelbo test strength and drop strength as well as tensile strength and flexural strength. The laminate sheets of the present invention are comparable to the prior art products in flatness, and are more advantageous in the economical standpoint as well.

For testing, the laminate sheets 1 to 6 inclusive of the present invention were practically used to package roll-films, sheet-form photographic paper, etc. The results have proven that there is a decrease in the occurrence of accidents such as breakage. This tendency has become more significant along with the increase in weight as well as thickness or volume of the articles to be packaged.

More specifically, the laminates of the present invention were cut into a rectangular form, which was heat-sealed on the three sides to form envelopes. It has been noted that there is decreased breakage, when roll-form articles in particular having sharp edges such as roll-films, photographic paper, cinefilms, photosensitive films for printing, X-ray films, etc., or sheet-form articles with the weight being more than 5 kg and, are packaged in these envelopes. Consequently, the laminates of the present invention are advantageous, especially when these articles are contained and carried in the (flat or gussetted) bag form. Due to their proper rigidity, it has been easy to seal the open edges of the bags according to the present invention with tapes, or alternatively to entirely seal them by heat-sealing. In particular, the laminate sheets of the present invention including carbon black in the inner side have show improved light-shielding.

TABLE 1

|  | Unit | Prior Art Laminate 1 | Prior Art Laminate 2 | Prior Art Laminate 3 | Invented Laminate 1 | Invented Laminate 2 | Invented Laminate 3 |
|---|---|---|---|---|---|---|---|
| Overall Thickness | μm | 200 | 157 | 115 | 151 | 192 | 107 |
| Viewed from the Outer Side 1st Layer | μm | LDPE Film 50(C3) | Kraft Paper (35 g/m²) 40 | BKM Film 40(C4-5) | Biaxially Stretched PET Film 20 | Laterally Uniaxially Stretched HDPE 50(C5) | BKM Film 40(C4-5) |
| 2nd Layer (Hot-Melt Adhesive Layer) | μm | LDPE 15 | LDPE 20 | LDPE 15 | (LDPE) 0 { 62 note that 2nd layer serves as an adhesive layer | (LDPE) 0 { 41 same as left | (LDPE) 0 { 19 same as left |
| 3rd Layer | μm | Aluminum Foil 7 | Aluminum Foil 7 | Aluminum Foil 7 | Biaxially Stretched Nylon-66 Perforated Film 35 | Longitudinally Stretched and Perforated HDPE Film 40 | Perforated Aluminum Foil 9 |
| Aperture Rate | % | 0 | 0 | 0 | 50 | 40 | 20 |
| Aperture Diameter | mm | 0 | 0 | 0 | 6 (round) | Minor Axis 3 Major Axis 8 (oval) | 3 (round) |
| 4th Layer (Hot-Melt Adhesive Layer) | μm | LDPE 15 | LDPE 20 | LDPE 15 | LDPE 40 | LDPE 45 | LDPE 20 |
| 5th Layer | μm | Kraft Paper (35 g/m²) | LDPE Film 70(C3) | BKM Film 40(C4-5) | L-LDPE Film 70(C5) | L-LDPE 85%* Mixed LDPE 10% Film Carbon 5% 70(C5) | BKM Film 40(C4-5) |
| 6th Layer (Hot-Melt Adhesive Layer) | μm | LDPE 15 |  |  |  |  |  |
| 7th Layer |  | LDPE Film 50(C3) |  |  |  |  |  |

|  | Unit | Invented Laminate 4 | Invented Laminate 5 | Invented Laminate 6 | Test Method or Standard |
|---|---|---|---|---|---|
| Overall Thickness | μm | 200 | 155 | 195 | JIS P 8118 |
| Viewed from the Outer Side 1st Layer | μm | Mitsui Tafuneru Polypropylene Unwoven Fabric 40 | Kraft Paper (35 g/m²) 40 | LDPE Film 50(C3) | JIS P 8118 |
| 2nd Layer (Hot-Melt Adhesive Layer) | μm | (LDPE) 0 { 62 same as left | LDPE 0 { 34 same as left | LDPE 0 { 33 same as left | JIS P 8118 |
| 3rd Layer | μm | Biaxially Stretched and Perforated Polypropylene Film 50 | Biaxially Stretched Nylon-6 Perforated Film 20 | Biaxially Stretched PET Perforated Film 20 | JIS P 8118 |
| Aperture Rate | % | 60 | 30 | 35 | Note (1) Note (2) |
| Aperture Diameter | mm | Combined Apertures 2 (round) Minor Axis 3 Major Axis 9 (oval) | 5 (round) | Minor Axis 2 Major Axis 3 (oval) |  |
| 4th Layer (Hot-Melt | μm | LDPE 50 | LDPE 25 | LDPE 25 | JIS P 8118 |

TABLE 1-continued

| | | | | | |
|---|---|---|---|---|---|
| Adhesive Layer) | | | | | |
| 5th Layer | μm | L-LDPE 75%*<br>LDPE 20%<br>Carbon 3%<br>Aluminum<br>Paste 2%<br>60(C5) | Mixed Film | LDPE Film<br>70(C3) | Kraft Paper<br>(35 g/m²) | JIS P 8118 |
| 6th Layer<br>(Hot-Melt<br>Adesive Layer) | μm | Surlyn<br>20 | | | LDPE<br>15 | JIS P 8118 |
| 7th Layer | | | | | LDPE Film<br>50(C3) | JIS P 8118 |

Note:
C(3) contains carbon black, LDPE denotes low-density polyethylene, L-LDPE denotes low-pressure linear low-density polyethylene, and % means % by weight.

TABLE 2

| | Unit | Prior art product 1 | Prior art product 2 | Prior art product 3 | Invented article 1 | Invented article 2 | Invented article 3 | Invented article 4 | Invented article 5 | Invented article 6 | Testing methods |
|---|---|---|---|---|---|---|---|---|---|---|---|
| Overall thickness of laminate | μm | 200 | 157 | 115 | 151 | 192 | 107 | 200 | 155 | 195 | JIS-P 8118 |
| Aperture rate | % | — | — | — | 50 | 40 | 20 | 60 | 30 | 35 | Note(1) |
| Tear strength longitudinal | g | 294 | 183 | 343 | not cut | 1230 | 983 | not cut | 421 | 828 | JIS-P 8116 |
| Tear strength lateral | g | 610 | 278 | 496 | not cut | not cut | not cut | not cut | 628 | 1040 | JIS-P 8116 |
| Extent of impact perforation front | kg · cm | 5.1 | 4.2 | 9.3 | 14.6 | 18.2 | 14.3 | 19.7 | 10.1 | 12.1 | JIS-P 8134 |
| Extent of impact perforation back | kg · cm | 5.8 | 6.2 | 10.6 | 15.1 | 19.5 | 14.6 | 21.9 | 11.3 | 13.9 | JIS-P 8134 |
| Curling | cm | 2.5 | 18 | 8.7 | 2.0 | 0.5 | 1.8 | 1.1 | 6.2 | 0.5 | Note(3) |
| Gelbo test strength | cycles | 18 | 6 | 16 | 180 | 200 | 38 | more than 300 | 53 | 78 | U.S. MIL-B131 |
| Drop strength | cycles | 1 | 1 | 3 | 9 | 11 | 5 | 8 | 6 | 4 | Note(4) |

Reference will finally be made to the methods of measuring the aperture rate, aperture diameter, curling and drop strength in the present invention.

Notes for Table 1

Note (1) Aperture Rate $$\text{Aperture Rate (\%)} = \frac{X \text{ cm}^2}{100 \text{ cm}^2} \times 100$$

where X is the area in cm² of apertures included in the 100-cm² square area of a perforated sheet.

Note (2) Aperture Diameter
Diameter in mm in the case of a round form.

Note (3) Curling
Round test pieces of 10 cm in diameter were prepared out of the sheet under test, and were allowed to stand discretely on a flat plate for 24 hours in an atmosphere of 20° C. temperature and 65% humidity. The curling is then expressed in terms of (10−L) in cm, where L was a distance between both ends of each piece after 24 hours.

Note (4) Drop Strength
A test bag charged with 1 kg of sand was repeatedly allowed to drop from a height of 1 m above the floor until it fractured. The drop strength is then expressed in terms of the number of falling cycles until fracture occurred.

The present invention can be modified based on the essential concept of the present invention without departing from the concept and the scope herein described and claimed.

What is claimed is:

1. A laminate sheet of at least three layers including a perforated sheet layer, and flexible sheet layers laminated on both sides of the perforated sheet layer wherein:
   (a) said perforated sheet layer has a thickness of 0.006 to 1.0 mm and an aperture rate of 10 to 90%,
   (b) an adhesive layer is applied on only one of said flexible sheet layers and the other flexible sheet layer is bonded by the adhesive layer extending throughout said apertures, and
   (c) said two flexible sheet layers are bonded together through said perforated sheet layer by means of said adhesive layer over an area of 5 to 95% of the overall area.

2. The laminate sheet as defined in claim 1, in which said perforated sheet layer is formed of a metal foil, paper, unwoven fabrics, cellophane, cloth, cellulose triacetate film or a thermoplastic resin film.

3. The laminate sheet as defined in claim 1, in which said apertures in said perforated sheet layer have a diameter of 0.5 to 25 mm.

4. The laminate sheet as defined in claim 3, in which at least one of said flexible sheet layers laminated on both sides of said perforated sheet layer is a heat-sealable layer.

5. The laminate sheet as defined in claim 4, in which said heat-sealable layer is a thermoplastic resin film formed of polyethylenes, polypropylene, nylon, polyester, ethylene-vinyl acetate copolymers, ethylene-acrylate copolymers, polyvinyl chloride or polyvinylidene chloride.

6. The laminate sheet as defined in claim 4, in which at least one of said flexible sheet layers laminated on both sides of said perforated sheet layer is formed of a thermoplastic resin film that is molecule-oriented uniaxially or biaxially.

7. The laminate sheet as defined in claim 6, in which said flexible sheet layers laminated on both sides of said perforated sheet layer are uniaxially molecule-oriented, thermoplastic films which are laminated through said adhesive layer with their orienting axes intersecting at angles of at least 30°.

8. The laminate sheet as defined in of claim 6, in which, of said flexible sheet layers laminated on both sides of said perforated sheet layer, the layer to come into contact with an article is formed of L-LDPE, and the other layer is formed of uniaxially or biaxially molecule-stretched thermoplastic resin film.

9. The laminate sheet as defined in of claim 6, in which said molecule-oriented film is high-density polyethylene layers having a density of 0.94 g/cm$^3$ or higher with one of the layers having a thickness of 15 to 120 microns inclusive.

10. The laminate sheet for the packaging of photosensitive materials as defined in claim 6, in which one or more layers of said laminate sheet contain a light-shielding material.

11. The laminate sheet for the packaging of photosensitive materials as defined in claim 6, in which said molecule-oriented film is an obliquely molecule-orientated, high-density polyethylene film having a density of at least 0.94 g/cm$^3$, and contains 0.5 to 7% by weight of carbon black.

12. The laminate sheet for the packaging of photosensitive materials as defined in claim 6, in which said heat-sealable flexible sheet layer laminated on the side of said perforated sheet layer to come into contact with an article is formed of a thermoplastic resin layer, has a melting point lower than that of said molecule-oriented film by at least 5° C. so that it is easily heat-sealable, and contains 0.5 to 15% by weight of a light-shielding material.

13. The laminate sheet for the packaging of photosensitive materials as defined in claim 6, in which said uniaxially molecule-oriented film is a high-density polyethylene film of at least 0.94 g/cm$^3$, that is uniaxially stretched at a magnitude of stretching of 2 to 7 and contains 0.5 to 7.0% by weight of carbon black, and said perforated sheet layer is substantially formed of a thermoplastic resin selected from the group consisting of polyethylenes of LDPE, L-LDPE, MDPE and HDPE, polypropylene, polyester, nylon, EEA, EVA, PVC and PVCD.

14. The laminate sheet for the packaging of photosensitive materials as defined in any one of claims 1 to 10, in which said flexible sheet layers are uniaxially stretched, high-density polyethylene film which have a thickness of 15 to 70 microns with the orienting axes of the layers intersecting at an angle of at least 30°, and said adhesive layer is formed of a polyolefinic thermoplastic resin.

15. The laminate sheet as defined in claim 1, which is a material for the packaging of photosensitive materials, and contains 0.5 to 20 g/cm$^2$ of a light-shielding material in its entirety.

16. The laminate sheet as defined in claim 1, in which, of said flexible sheet layers thereof, the layer to come into no contact with an article is additionally laminated on the outer surface with a further pliable sheet layer having a heat resistance higher than that of the flexible sheet layer coming into contact with the article by at least 5° C.

17. The laminate sheet as defined in claim 16, in which said further pliable sheet layer having the higher heat resistance by at least 5° C. is formed of various types of paper, aluminium-deposited paper, aluminum-deposited thermoplastic resin films, cellophane, unwoven fabrics, cloth or metal foils, each having a thickness of 10 microns or more.

18. The laminate sheet for the packaging of photosensitive materials as defined in claim 17, in which said further pliable sheet layer is a paper layer of 30 to 110 microns as at least one of the light-shielding and heat-resistant layer.

19. The laminate sheet as defined in claim 1, in which the apertures in said perforated sheet layer are substantially in the form of a circle, oval, pillow, triangle with rounded apieces, petal, gourd, coccoon or polygon with the apices being 90° or more.

20. The laminate sheet as defined in claim 19, in which said apertures are in the form with no apices, or in the form of a circle, oval, pillow, triangle with rounded apices, petal, gourd or coccoon.

* * * * *